US011162605B2

(12) United States Patent
Boticki et al.

(10) Patent No.: US 11,162,605 B2
(45) Date of Patent: Nov. 2, 2021

(54) FLUID DISPENSER REMOTE ACTUATION SYSTEM AND METHOD

(71) Applicants: John Boticki, Mount Pleasant, WI (US); Jim Bournoville, Racine, WI (US); Paul Larson, Racine, WI (US)

(72) Inventors: John Boticki, Mount Pleasant, WI (US); Jim Bournoville, Racine, WI (US); Paul Larson, Racine, WI (US)

( * ) Notice: Subject to any disclaimer, the term of this patent is extended or adjusted under 35 U.S.C. 154(b) by 0 days.

(21) Appl. No.: 13/921,783

(22) Filed: Jun. 19, 2013

(65) Prior Publication Data

US 2013/0341541 A1    Dec. 26, 2013

Related U.S. Application Data

(60) Provisional application No. 61/662,026, filed on Jun. 20, 2012.

(51) Int. Cl.
*F16K 31/08* (2006.01)
*F16K 31/40* (2006.01)
(Continued)

(52) U.S. Cl.
CPC .......... *F16K 31/082* (2013.01); *B05B 12/002* (2013.01); *F16K 31/084* (2013.01);
(Continued)

(58) Field of Classification Search
CPC .... F16K 31/082; F16K 31/365; F16K 31/404; F16K 31/084; Y10T 137/2652;
(Continued)

(56) References Cited

U.S. PATENT DOCUMENTS 3,212,751 A * 10/1965 Hassa ................... F16K 31/086
                                                        251/129.03
4,311,160 A    1/1982 Charland
(Continued)

FOREIGN PATENT DOCUMENTS

DE          2435256 A1      8/1975
DE          3409673 A1      9/1985
WO       WO2011127031      10/2011

OTHER PUBLICATIONS

DEMA Engineering Co., "700 Series DAH 'Dilution at Hand' Blend Centers", owner's manual, May 5, 2011, pp. 1-18, St. Louis, MO USA.
(Continued)

*Primary Examiner* — Umashankar Venkatesan
*Assistant Examiner* — Andrew J Rost
(74) *Attorney, Agent, or Firm* — GottardoLaw LLC

(57) ABSTRACT

This invention relates generally to the dispensing of a fluid. More specifically, the invention relates to an apparatus and method for remotely controlling the flow of an effluent fluid stream from a dispensing hose of a fluid dispenser. An actuator controls at least one valve assembly of the fluid dispenser and comprises a generator located remotely of the at least one valve assembly, for generating a low-pressure signal, and at least one receiver in fluid communication with the generator for receiving the low pressure signal of each receiver operably associated with each valve assembly. The actuator also facilitates the simultaneous, sequential and alternate control of the at least one valve assembly.

20 Claims, 13 Drawing Sheets

(51) Int. Cl.
  *F16K 31/365* (2006.01)
  *F16K 31/46* (2006.01)
  *B05B 12/00* (2018.01)

(52) U.S. Cl.
  CPC .......... *F16K 31/365* (2013.01); *F16K 31/404* (2013.01); *F16K 31/46* (2013.01)

(58) Field of Classification Search
  CPC ..... Y10T 137/87708; Y10T 137/87716; Y10T 137/87764; B05B 12/002; B08B 3/028
  USPC ..... 251/65, 61.4, 62, 29; 137/595, 861, 862, 137/488, 869, 863, 118.02, 137/119.03–119.09; 239/126, 412, 532, 239/530, 525, 527, 528; 222/145.5, 504, 222/529
  See application file for complete search history.

(56) References Cited

U.S. PATENT DOCUMENTS

| | | | |
|---|---|---|---|
| 4,630,644 A | | 12/1986 | Hafner, V et al. |
| 4,792,113 A | * | 12/1988 | Eidsmore ................ 251/65 |
| 4,815,634 A | | 3/1989 | Nowicki |
| 4,819,682 A | * | 4/1989 | Van Marcke ........ F16K 31/404 137/1 |
| 4,940,207 A | * | 7/1990 | Katsuyama .............. 251/65 |
| 5,029,806 A | * | 7/1991 | Huo-Lien et al. ........... 251/14 |
| 5,039,061 A | * | 8/1991 | Heard et al. ............... 251/65 |
| 5,095,941 A | * | 3/1992 | Betz ................ E03C 1/052 137/552 |
| 5,129,620 A | * | 7/1992 | Castetter ................ 251/65 |
| 5,511,763 A | * | 4/1996 | Green ................ E03C 1/052 251/129.02 |
| 5,628,490 A | | 5/1997 | Roberts et al. |
| 5,758,863 A | * | 6/1998 | Buffet et al. ................ 251/28 |
| 6,123,315 A | * | 9/2000 | Keller ................ E03C 1/052 251/41 |
| 6,299,035 B1 | * | 10/2001 | Dalhart ................ B05B 7/30 222/505 |
| 6,607,174 B2 | | 8/2003 | Weber et al. |
| 7,163,617 B2 | | 1/2007 | Treiman |
| 2005/0139796 A1 | * | 6/2005 | Altonji ................ 251/63.5 |
| 2007/0034644 A1 | | 2/2007 | Bertucci et al. |
| 2010/0132814 A1 | | 6/2010 | Schiller et al. |

OTHER PUBLICATIONS

DEMA Engineering Co., "Maintaining and Servicing the DAH Blend Center", owner's manual, Nov. 18, 2010, p. 9 of 18, St. Louis, MO USA.

DEMA Engineering Co., "Parts List for DAH Blend Center (Bottle/Hose Fill Applications)", owner's manual, date unkown, figs 1 and 2, St. Louis, MO USA.

DEMA Engineering Co., "Parts List for DAH Blend Center (Remote Fill Hose Assembly Application)", owner's manual, date unkown, figs 3 and 5 and p. 7 of 8, St. Louis, MO USA.

DEMA Engineering Co., "Parts List for DAH Blend Center", owner's manual, date unkown, figs 6-11 and 12-14, St. Louis, MO USA.

DEMA Engineering Co., "Parts List for DAH Rack Assemblies", owner's manual, date unkown, figs 15 and 16, St. Louis, MO USA.

DEMA Engineering Co., "DEMA Dilution—At-Hand Extreme 800 Series Chemical Dispensers", owner's manual, Jan. 16, 2012, pp. 1-8, St. Louis, MO USA.

DEMA Engineering Co., "Dilution-At-Hand Extreme", catalog, 2009, pp. 1-6, St. Louis, MO USA.

Hydro Systems Company, "Accupro Series Proportioner for 1,2 and 3 Button Units with Hrdrogap Air Gap Eductor", owner's manual, May 2009, pp. 1-2, Cincinatti, OH USA.

Hydro Systems Company, "Accupro Series Proportioner with E-Gap Eductor, 1,2 and 3 Button Units", owner's manual, Apr. 2009, pp. 1-2, Cincinatti, OH USA.

Hydro Systems Company, "Accupro Proportioner Model 3974AG & 3975 AG with Airgap Eductors", owner's manual, Aug. 2010, pp. 1-2, Cincinatti, OH USA.

Hydro Systems Company, "Accupro Proportioner Model 3976AG & 3978 AG with Airgap Eductors", owner's manual, Mar. 2010, pp. 1-2, Cincinatti, OH USA.

Hydro Systems Company, "Accupro Proportioner Model 39711 & 39721 with E-gap Eductors", owner's manual, Nov. 2009, pp. 1-2, Cincinatti, OH USA.

Hydro Systems Company, "Accupro Proportioner Model 39741 & 39751 with E-gap Eductors", owner's manual, Jan. 2010, pp. 1-2, Cincinatti, OH USA.

Hydro Systems Company, "Accupro Proportioner Model 39761 with E-gap Eductors", owner's manual, Jul. 2009, pp. 1-2, Cincinatti, OH USA.

Hydro Systems Company, "Hydromaster Model 206", owner's manual, Jan. 2006, pp. 1-2, Cincinatti, OH USA.

Hydro Systems Company, "Hydromaster Model 208", owner's manual, Jul. 2007, pp. 1-2, Cincinatti, OH USA.

Hydro Systems Company, "Hydromaster Model 216", owner's manual, Oct. 1998, pp. 1-2, Cincinatti, OH USA.

Hydro Systems Company, "Hydromaster Model 220", owner's manual, Oct. 1998, pp. 1-2, Cincinatti, OH USA.

Hydro Systems Company, "QDV Models 8420, 8428, 8430, 8438, 8440, 8441 Units with Bottle and/or Button Activation", owner's manual, Jan. 2006, pp. 1-4, Cincinatti, OH USA.

Hydro Systems Company, "QDV Models 8422, 8424, 8432, 8442, 8443 Units with Bottle and/or Button Activation & Drip Tray", owner's manual, Mar. 2006, pp. 1-4, Cincinatti, OH USA.

Hydro Systems Company, "QDV Models 8423, 8425, 8433, 8435 Units with Remote Gun and Bottle Activation", owner's manual, Jan. 2006, pp. 1-4, Cincinatti, OH USA.

Hydro Systems Company, "Proportioning and Dispensing Systems Accupro Series", catalog, 2010, pp. 7 and 8, Cincinatti, OH USA.

Hydro Systems Company, "Proportioning and Dispensing Systems HydroMaster Series", catalog, 2010, pp. 23 and 24, Cincinatti, OH USA.

Hydro Systems Company, "Proportioning and Dispensing Systems QDV Series", catalog, 2010, pp. 13 and 14, Cincinatti, OH USA.

* cited by examiner

FLUID DISPENSER REMOTE ACTUATION SYSTEM AND METHOD

CROSS REFERENCE TO RELATED APPLICATIONS

This application claims priority to U.S. Provisional Application Ser. No. 61/662,026 filed on Jun. 20, 2012.

TECHNICAL FIELD OF THE INVENTION

This invention relates generally to the dispensing of a fluid. More specifically, the invention relates to an apparatus and method for remotely controlling the flow of an effluent fluid stream from a dispensing hose of a fluid dispenser.

BACKGROUND OF THE INVENTION

The mixing of detergent or other concentrates with a water stream commonly occurs in preparation for cleaning services within a commercial facility. During such mixing, the liquid concentrate is drawn from a source and mixed, via an eductor utilizing Venturi action, with a diluent water stream to form the overall diluted detergent or other effluent mixture. The foregoing mixing function typically occurs within a wall mounted cabinet that houses one or more concentrate sources (i.e., bottles of detergent or other concentrate) and is connected to a water source. A dispensing hose is typically connected to the cabinet for dispensing the water-concentrate mixture effluent into a bucket or other receptacle.

Such mixing cabinets typically utilize a switch or actuator for dispensing the effluent mixture from the dispensing hose, typically turning the effluent flow on and "off" via the operation of a flow valve located within the cabinet. However, operation of the switch or actuator preferably occurs remotely of the flow valve and cabinet and proximal to the discharge end of the dispensing hose. This is because a person filling a bucket or other receptacle with the dispensing hose is usually located at the dispensing hose's discharge end during such filling operations. A dispensing hose will typically have a housing or handle located near the hose's discharge end, with the housing or handle allowing for an operation of the actuator for controlling the valve. Thus, a user of the dispensing hose can hold or grip the housing or handle and operate the actuator to turn on or off the flow of effluent mixture from the hose.

Various systems are present within the industry that allow for an operation of the actuator from near the discharge end of the dispensing hose, to remotely operate the flow valve, located within the wall mounted cabinet. Such systems include complicated mechanical linkage systems utilizing cables or similar mechanisms for actuating the flow valve. Other systems utilize a network of fluid lines for actuating the flow valve utilizing fluid pressure differentials. Both of the foregoing systems are fraught with disadvantages relating to their respective designs.

For example, the cable linkage systems are prone to kinking or corrosion between the actuator or switch and valve, thus possibly resulting in the valve remaining in the "on" position and causing an undesirable continuous flow of effluent exiting the discharge end of the dispensing hose. Similarly, the fluid lines for actuating the valve may kink or break, again possibly resulting in the valve remaining in the "on" position with an undesirable continuous flow of effluent exiting the discharge hose. A breakage of the fluid lines also results in an undesirable continuous flow of the diluent water therefrom where the diluent water is utilized as the fluid medium creating the pressure differential operating the valve. Such systems, when a kink or breakage occurs, have thus been known to cause flooding and related damage within the facilities in which they are used.

Furthermore, the prior art mechanical linkage and fluid line systems cannot efficiently facilitate the simultaneous or sequential actuation of two or more valves of a dispensing system, or the alternate selection of at least one valve of the two or more valves. Such simultaneous, sequential and alternate valve actuation is useful for varying dispenser flow rates, adding or selecting one or more liquid concentrates or other additives thereto and/or selecting one or more dispenser mixtures. The present invention overcomes the foregoing disadvantages and presents numerous other advantages over the prior art systems.

SUMMARY OF THE INVENTION

This invention relates generally to the dispensing of a fluid. More specifically, the invention relates to an apparatus and method for remotely controlling the flow of an effluent fluid stream from a dispensing hose of a fluid dispenser. An actuator controls at least one valve assembly of the fluid dispenser, with each valve assembly of the at least one valve assembly connected to a fluid source and comprising at least a magnet, magnet spring and co-acting armature. In one embodiment, the actuator comprises a generator located remotely of the at least one valve assembly, for generating a low-pressure signal, and at least one receiver in fluid communication with the generator and operably associated with each valve assembly for receiving the low pressure signal.

The generator preferably comprises a piston and cylinder combination located within a dispensing handle of the fluid dispenser, a bellows or a regulated pressure source. The at least one receiver preferably comprises a pressure vessel defining a closed-volume chamber in fluid communication with the generator and a low-friction diaphragm in fluid communication with the closed-volume chamber. The diaphragm is responsive to the low pressure signal of the generator to generate a diaphragm force operable to move the magnet of the respective valve assembly to influence the assembly's armature to open the valve assembly.

In another embodiment, the at least one valve assembly comprises two or more valve assemblies, with the at least one receiver comprising two or more receivers and the magnet springs of the two or more receivers having identical spring forces to facilitate a simultaneous actuation of the two or more valve assemblies. In yet another embodiment, the at least one valve assembly comprises two or more valve assemblies, with the at least one receiver comprising two or more receivers and the magnet springs of the two or more receivers having differing spring forces to facilitate a sequential actuation of the two or more valve assemblies. In a further embodiment, the at least one valve assembly comprises two or more valve assemblies and the at least one receiver comprises two or more receivers, with the actuator further comprising a selector valve to facilitate an alternate fluid flow connection between the generator and at least one receiver of the two or more receivers.

DESCRIPTION OF THE EMBODIMENTS

Figure 1:
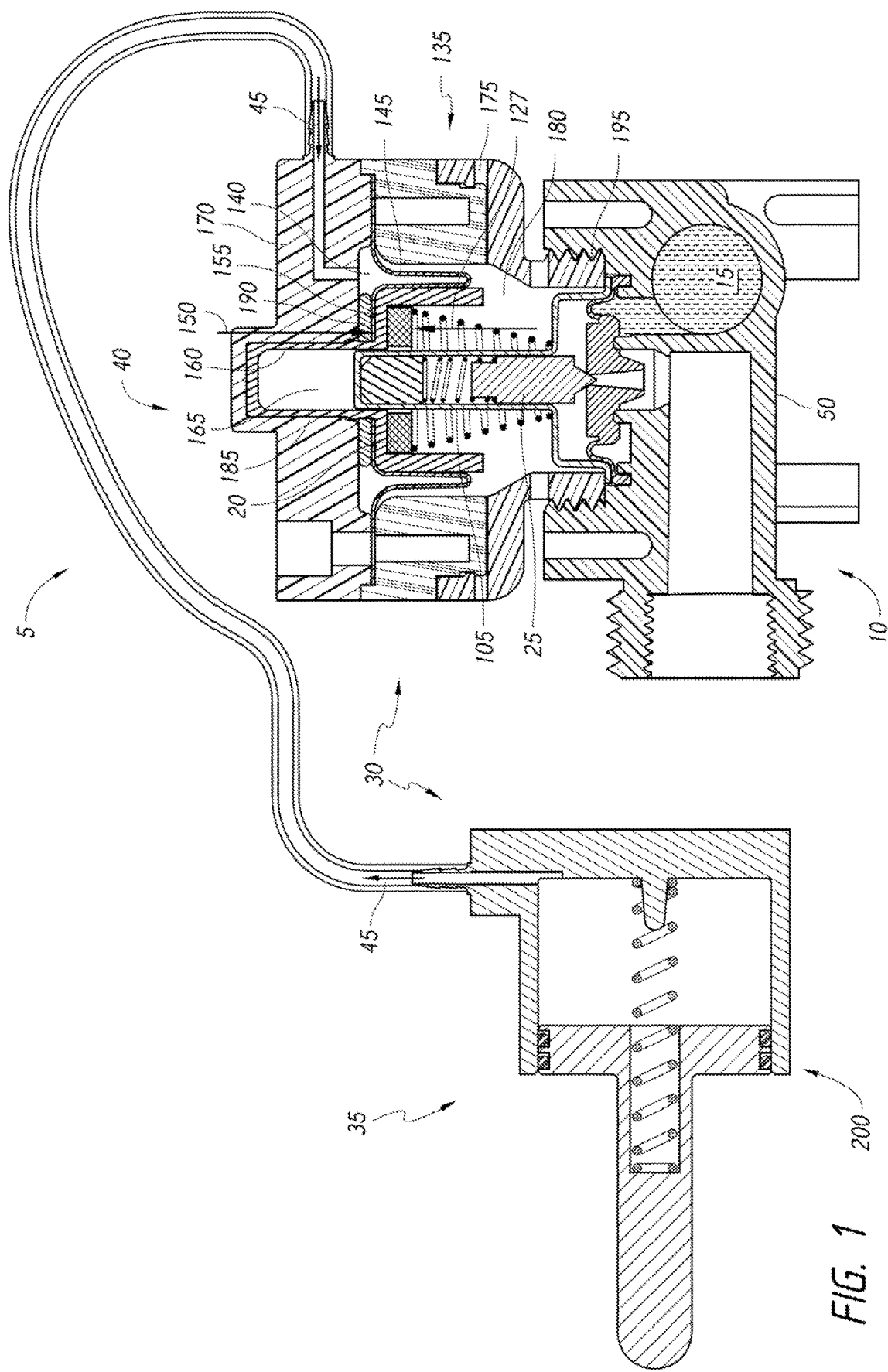
FIG. 1 is a sectional elevation view of one embodiment of the actuator illustrating the generator and receiver in fluid communication with one another.

This invention relates generally to the dispensing of a fluid. More specifically, the invention relates to an apparatus and method for remotely controlling the flow of an effluent fluid stream from a dispensing hose of a fluid dispenser. In an embodiment illustrated in FIG. 1, the apparatus 5 comprises a valve assembly 10 connected to a fluid source 15 and having at least a magnet 20 and co-acting armature 25. An actuator 30, preferably comprising a low-pressure signal generator 35 and receiver 40, is operably associated with the valve assembly to move the magnet to influence the armature via the receipt of a low pressure signal 45 from the low pressure signal generator.

An eductor (not illustrated), commonly known in the art for adding at least one additive to the fluid stream via Venturi action, is in fluid communication with and located downstream of the valve assembly. The incoming fluid stream is restricted by a nozzle, while the speed of the outgoing fluid stream is decreased by an inverted funnel shape defined within the eductor. The result is a low pressure or vacuum point in the middle of the eductor where at least one additive may be drawn through an inlet of the eductor and into the fluid stream exiting the eductor. The amount of additive introduced through the additive inlet of the eductor may be regulated by interchangeable metering tips that restrict the additive's flow into the fluid stream, or by other means understood in the art. A backflow preventer (not illustrated), also commonly known in the art, is typically located between the eductor and valve to prevent any flow of the fluid and additive back to the fluid source. A dispensing hose, for dispensing the fluid from the discharge end of the hose, is in fluid communication with and located downstream of the eductor. In a preferred embodiment of the invention, the low-pressure signal generator is located remotely of the receiver.

Figure 2:
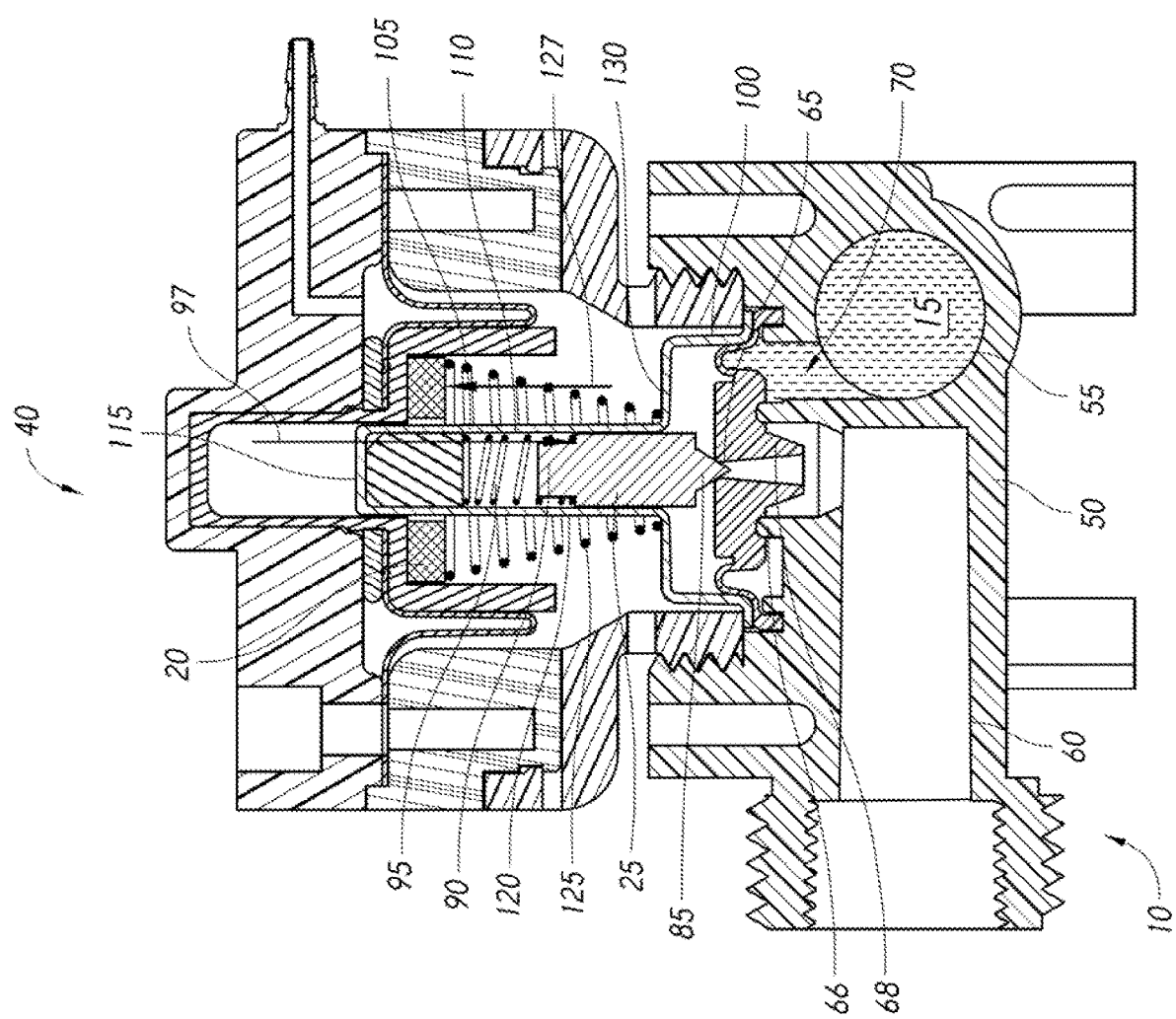
FIG. 2 is a sectional view of one embodiment of the receiver and valve assembly in the closed position.

Referring to FIG. 2 illustrating one embodiment of the receiver 40 and valve assembly 10, the valve assembly preferably comprises a valve manifold 50 defining fluid inlet and outlet channels 55 and 60 separated by an armature seat 65 and valve seal seat 66. The fluid inlet channel of the valve assembly is in fluid communication with the fluid source 15, such as a water spigot, while the outlet channel is in fluid communication with the eductor, backflow preventer and dispensing hose. The valve armature 25, matingly configured with the armature seat 65, and a valve seal 68, matingly configured with the valve seal seat 66 to establish the valve 70, are each movable between open and closed positions in relation to their respective seats to control the flow of fluid from the inlet 55 to the outlet channel 60. The armature, preferably comprised of a ferrous material and defining a needle end 85 and a spring end 90, is spring biased to the closed position (i.e., engagement with the armature seat) by an armature spring 95 generating an armature spring force 97. A bonnet 100 defining an armature sleeve 105 is connected to the valve manifold 50 and covers the armature seat 65 and armature 25. The armature 25 is slidingly located within the interior 110 of the sleeve 105, with the armature spring 95 abutting a closed end 115 of the sleeve and acting against spring end 90 of the armature to bias, via the armature spring force 97, the armature's needle end 85 against the seat 65.

Figure 3:
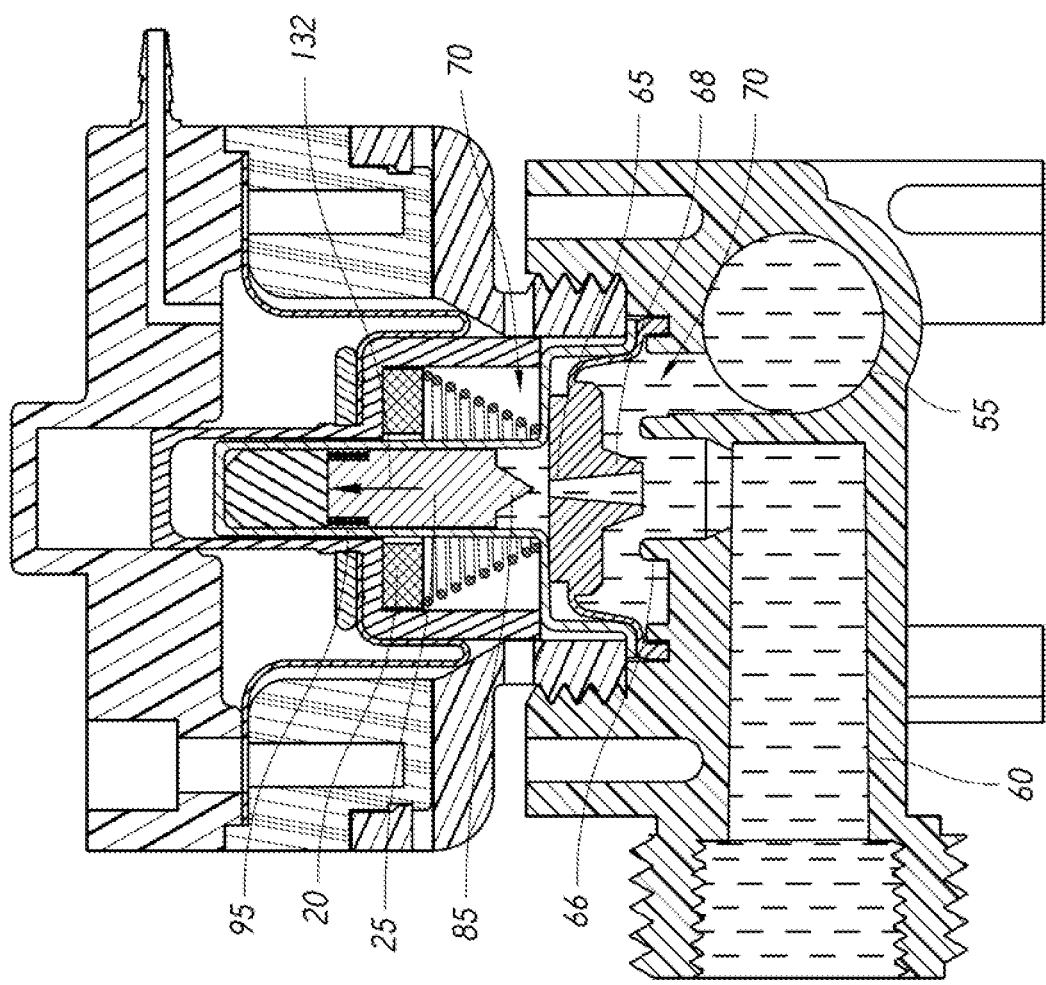
FIG. 3 is a sectional view of one embodiment of the receiver and valve assembly of FIG. 2 in the opened position.

The magnet 20, configured for co-action with the armature 25, is coaxially located about the exterior 120 of the bonnet's armature sleeve 105 and spring biased away from the armature by a magnet spring 125 generating a magnet spring force 127. The magnet spring, also coaxially located about the exterior of the sleeve, abuts a contact surface 130 of the bonnet and acts against the magnet to bias the magnet away from the armature. As illustrated in FIG. 3, when the magnet 20 is moved into proximity with the ferrous armature 25, the magnetic force 132 of the magnet overcomes the armature spring force 97 of the armature spring 95 to draw the armature towards the magnet and away from the armature seat 65, permitting the valve seal 68 to separate from the valve seal seat 66, and thus opening the valve 70 to permit a flow of fluid between the valve assembly's inlet and outlet channels 55 and 60. Referring again to FIG. 2, when the magnet 20 is influenced by the force 127 of the magnet spring 125 to move away from the armature 25, the force 97 of the armature spring 95 moves the armature into the armature seat 65 to move the valve seal 68 into the valve seal seat 66, thus closing the valve 70 and precluding a flow of fluid between the valve's inlet and outlet channels 55 and 60. The actuator 30 moves the magnet 20 into proximity with the armature 25 and also allows the magnet to again move away from the armature, via the bias (i.e., force 127) of the magnet spring 125, to thus open and close the valve 70.

In a preferred embodiment of the invention, the actuator 30 comprises a low-pressure signal generator 35 and receiver 40. Referring again to FIG. 1, the low-pressure signal receiver 40 comprises a pressure vessel 135 defining a closed-volume chamber 140 in fluid communication with the generator 35. A low-friction diaphragm 145 is in fluid communication with the closed-volume chamber 140, with the diaphragm responsive to the low pressure signal 45 to generate a diaphragm force 150 operable to overcome the force 127 of the magnet spring 125 to move the magnet 20 of the valve assembly to influence the assembly's armature 25. A piston 155 is located between the diaphragm 145 and magnet 20 such that the force generated by the diaphragm will act on the piston 155 to move the magnet of the valve assembly to influence the assembly's armature. The piston defines a hollow finger 160 defining an interior 165 sized to accept the bonnet's sleeve 105 therein such that the piston can act on the magnet located about the sleeve.

The pressure vessel 135 further comprises a cap 170 and body 175 defining an internal void 180. At least the closed-volume chamber 140, diaphragm 145, piston 155, magnet 20, bonnet 100 and armature 25 are located within the void 180. The low-friction diaphragm 145 is sealingly located on the piston 155 about the exterior 185 of the hollow finger 160, and also sealingly located between the cap 170 and body 175 of the pressure vessel 135, to ensure the closed-volume nature of the chamber 140. A diaphragm retainer 190 is utilized to seal the diaphragm about the sleeve 105 while a compression seal is utilized to seal the diaphragm between the cap 170 and body 175. The cap of the vessel is attached to the body via a plurality of screws (not shown) while the body of the vessel is attached to the valve's manifold 50 via a threaded fitment 195.

Figure 4:
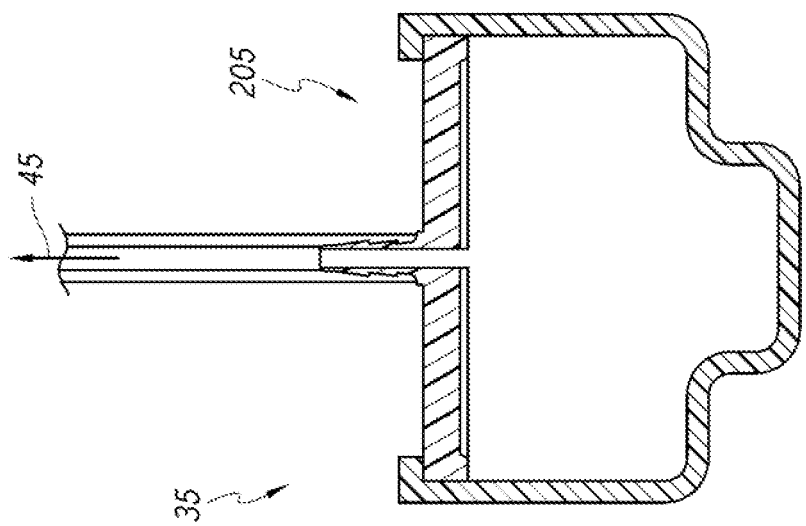
FIG. 4 is a sectional elevation view of an alternate embodiment of the generator of FIG. 1.

As illustrated in FIG. 1, the generator 35 is in fluid communication with the closed-volume chamber 140 of the pressure vessel 135 of the receiver 40. The low-pressure signal generated by the generator thus acts against the low-friction diaphragm 145, which defines a given area across the closed-volume chamber 140. The pressure acting against the diaphragm area is thus converted into a diaphragm force 150 (i.e., force=pressure×area) to drive the piston 155 against the magnet 20 to overcome the force 127 of the magnet spring 125. The low pressure signal may be generated either pneumatically (i.e., via gas-pressure) or hydraulically (i.e., via liquid pressure). As illustrated in FIGS. 1 and 4, respectively, the generator 35 may comprise a piston and cylinder combination 200 or bellows 205. Other embodiments of the generator may comprise a bladder, regulated pressure source or other component understood in the art to generate the low-pressure signal.

Figure 5:
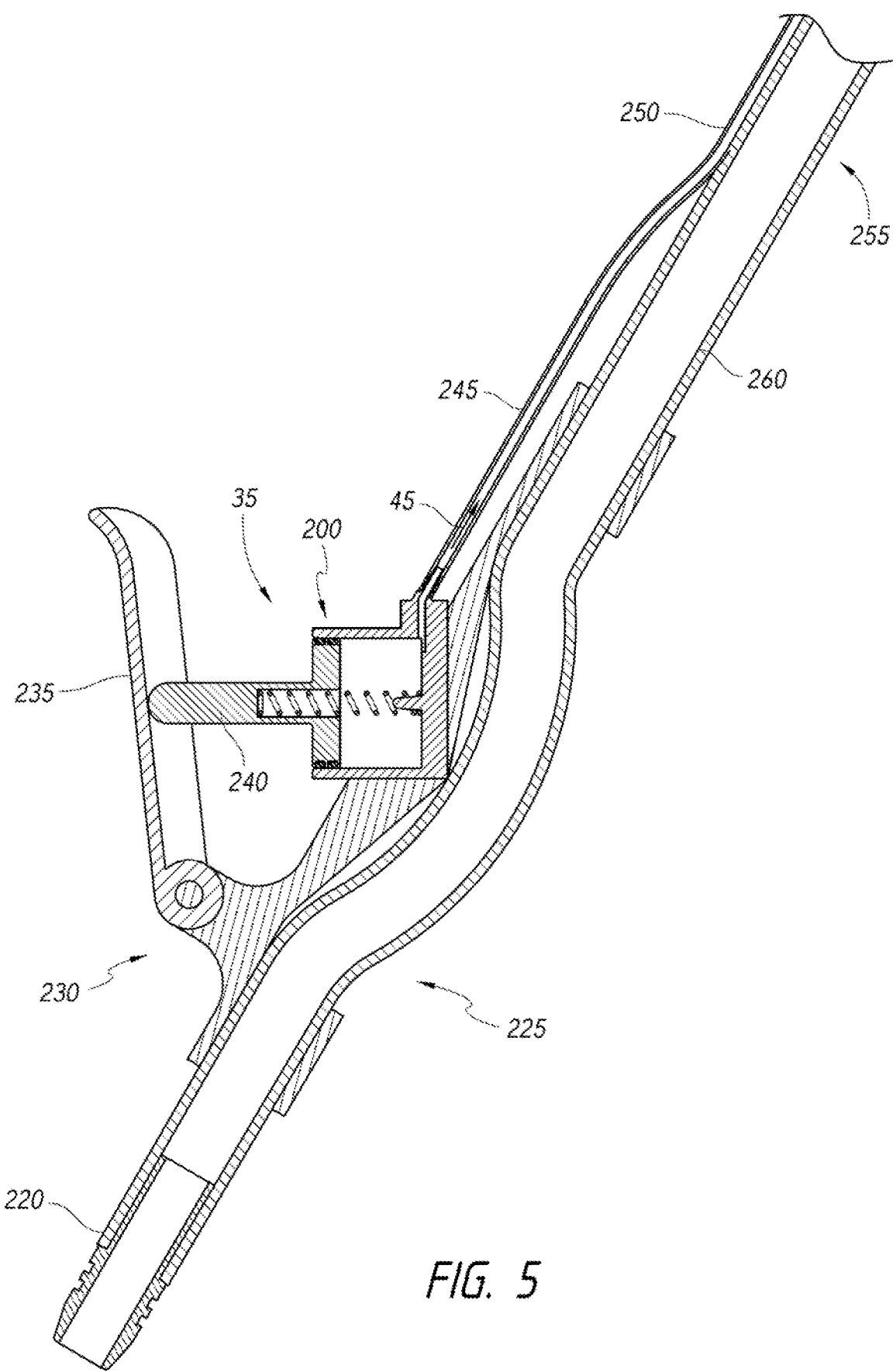
FIG. 5 is a sectional elevation view of one embodiment of the generator located within the dispensing handle of the dispensing hose.

In a preferred embodiment, the generator 35 is located remotely from the receiver 40 and valve assembly 10, preferably proximal to the discharge end 220 of the dispensing hose 225. As illustrated in FIG. 5, the generator 35 is preferably located within a dispensing handle 230 of the dispensing hose 225 and is operated by a trigger 235 or similar mechanism such as a lever or button. The trigger 235 depresses the generator piston 240 of the piston and cylinder combination 200 to generate the low pressure signal 45. The generator is in fluid communication with the receiver via, a lumen 245 connecting the two components. The lumen preferably comprises a predetermined length of ¹⁄₁₆ inch I.D. poly tubing. Because the standard length of a dispensing hose is about 8 feet, the lumen will have a similar length to facilitate a placement of the generator within the handle near the hose's discharge end. However, it is understood that other lumens of other lengths, inner diameters and compositions may be utilized as well, as understood by one of skill in the art.

As illustrated in FIG. 5, the lumen 245 is preferably located within a lumen conduit 250 of a bifurcated dispensing hose 255. The lumen conduit of the hose carries the lumen along the hose's length between the actuator and receiver. The other conduit of the bifurcated hose, namely the fluid conduit 260, carries the fluid mixture from the valve assembly 10 and/or eductor and backflow preventer to the discharge end 220 of the dispensing hose. However, it is understood that other configurations for carrying the lumen between the generator and receiver may be utilized as well. For example the lumen may be carried along the outside of a single-conduit dispensing hose, within the inside diameter of the single-conduit hose, or along other pathways as well.

Because the low pressure signal is generated manually by a user of the dispenser (i.e., via squeezing a trigger or similar mechanism, as discussed above), a low pressure signal is desirable to ensure that a minimal effort is required to generate it. In embodiments wherein the signal is generated pneumatically, the valve is actuated (i.e., opened) with a low pressure air signal of about 5 psi and released (i.e., closed) when the pressure is removed. More preferably, the valve is actuated with an air signal of about 3 psi and released at a pressure of less than about 0.25 psi. Optimally, the valve is actuated with an air signal pressure of about 2 psi and released at a pressure of about 0.75 psi or less. However, it is understood that the low pressure signal 45 may comprise any pressure to include a negative pressure (i.e., a vacuum) of any psi sufficient to draw the diaphragm 145 against the piston 155 to move the magnet 20.

In terms of air volume displacement when using a piston and cylinder combination as the generator, when using about 50 feet of ¹⁄₁₆ inch I.D. tubing to connect the generator and receiver, the valve can be actuated by displacing about 15 cubic centimeters (about 0.915 cu in) of air from a cylinder of the generator. A removal of this volumetric air displacement will release the valve. When using about the standard length of 8 feet of ¹⁄₁₆ inch I.D. tubing to connect the generator and receiver, the valve can be actuated by displacing about 10 cubic centimeters (about 0.610 cu in) of air from the cylinder of the generator. Again removal of this air displacement will again release the valve. In terms of liquid volume displacement when again using a piston and cylinder as the generator, the valve can be actuated by displacing about 5 cubic centimeters (about 0.305 cu in) of non-compressible liquid from the cylinder, regardless of the length of tubing utilized to connect the generator and receiver.

Figure 6:
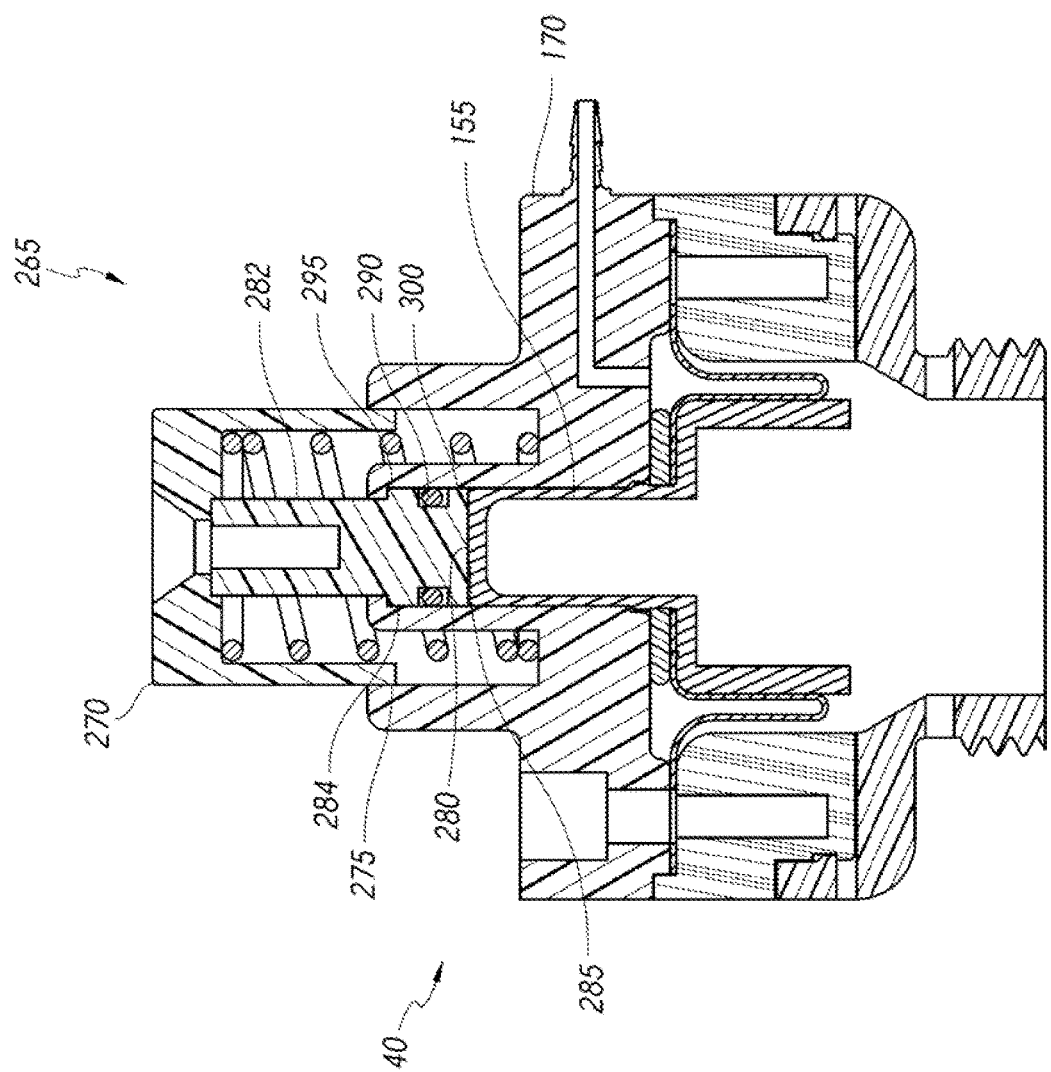
FIG. 6 is a sectional elevation view of the receiver of FIG. 1 further comprising a manual override.

In another embodiment of the invention, illustrated in FIG. 6, the actuator includes a manual override 265 in addition to or in place of the generator 35. The manual override is preferably located proximal to the receiver 40 and may be used when the generator is unavailable, or when a user of the dispenser wants to actuate the valve assembly from a location proximal to the assembly itself. The manual override 265 comprises an actuation button 270 or plunger in operable relation with the piston 155 of the receiver 40. A bore 275 is defined in the cap 170 of the receiver in axial alignment with the receiver's piston 155. A lower surface 280 of a stem 282 of the button 270 abuts an upper surface 285 of the piston 155 through a secondary bore 284 defined in the cap 170. A gasket 290 or seal is located between an outer side surface 295 of the button's stem and an inner side surface 300 of the secondary bore 284 to ensure that the closed-volume chamber 140 remains sealed. Depressing the manual override button of the actuator will thus depress the actuator's piston to move the valve assembly's magnet into proximity with the ferrous armature to draw the armature out of the armature seat, thus opening the valve. Releasing the button will allow the piston and magnet to again move away from the armature to allow the armature to return to its seated position, thus closing the valve.

It is noted that utilizing a low pressure air signal to actuate and open the normally-closed valve assembly has many advantages over the aforementioned prior art systems. For example, if the lumen connecting the generator with the receiver is severed or kinked during a use of the dispenser, the normally-closed valve will simply remain in the closed position to prevent any uncontrolled flow of the fluid mixture from the dispensing hose—thus making the system "fail-safe." Of course, the aforementioned manual override button may be utilized to nonetheless open the valve to dispense the fluid mixture in lieu of using the generator and lumen.

Unlike the present invention, prior art systems may not be "fail-safe" in that a kinked or severed cable or fluid line for controlling the actuator may result in the valve assembly remaining open to permit an uncontrolled flow of fluid mixture from the dispensing hose, possibly resulting in undesirable flooding. Also unlike the present invention, fluid lines of the prior art invention for controlling the actuator, if severed, may also result in undesirable flooding caused by the uncontrolled flow of fluid (i.e., water) from the lines.

Also unlike the present invention, the prior art mechanical linkage and fluid line systems cannot efficiently facilitate the simultaneous or sequential actuation of two or more valves of a dispensing system, or the alternate selection of at least one valve assembly of the two or more assemblies, with such simultaneous, sequential and alternate valve actuation being useful for varying dispenser flow rates and/or the addition of one or more liquid concentrates or other additives thereto.

Figure 7:
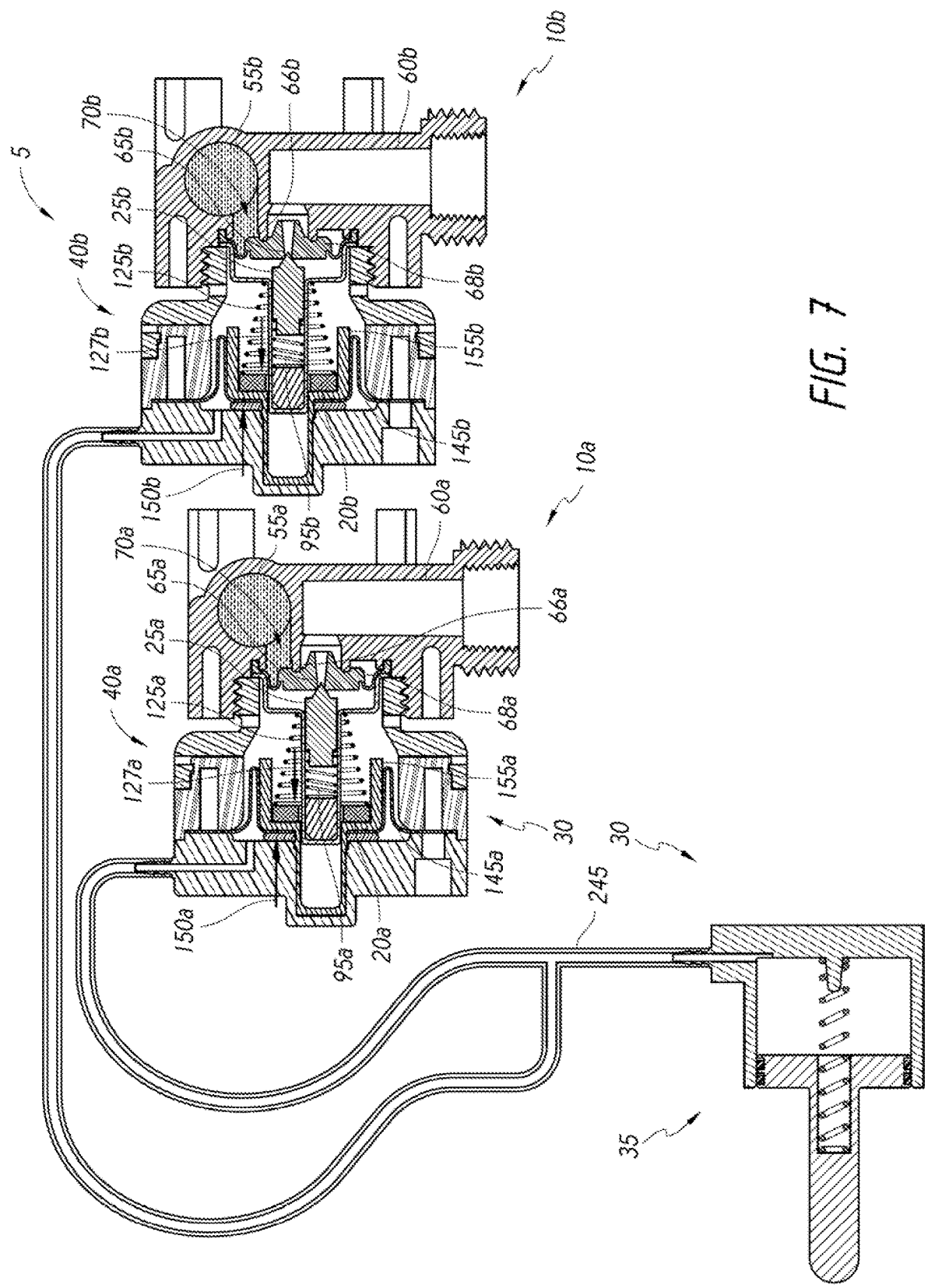
FIG. 7 is a sectional elevation view of one embodiment of the non-actuated actuator having multiple receivers and associated valve assemblies, the valve assemblies illustrated in the closed position and having magnet springs with identical spring forces.
Figure 8:
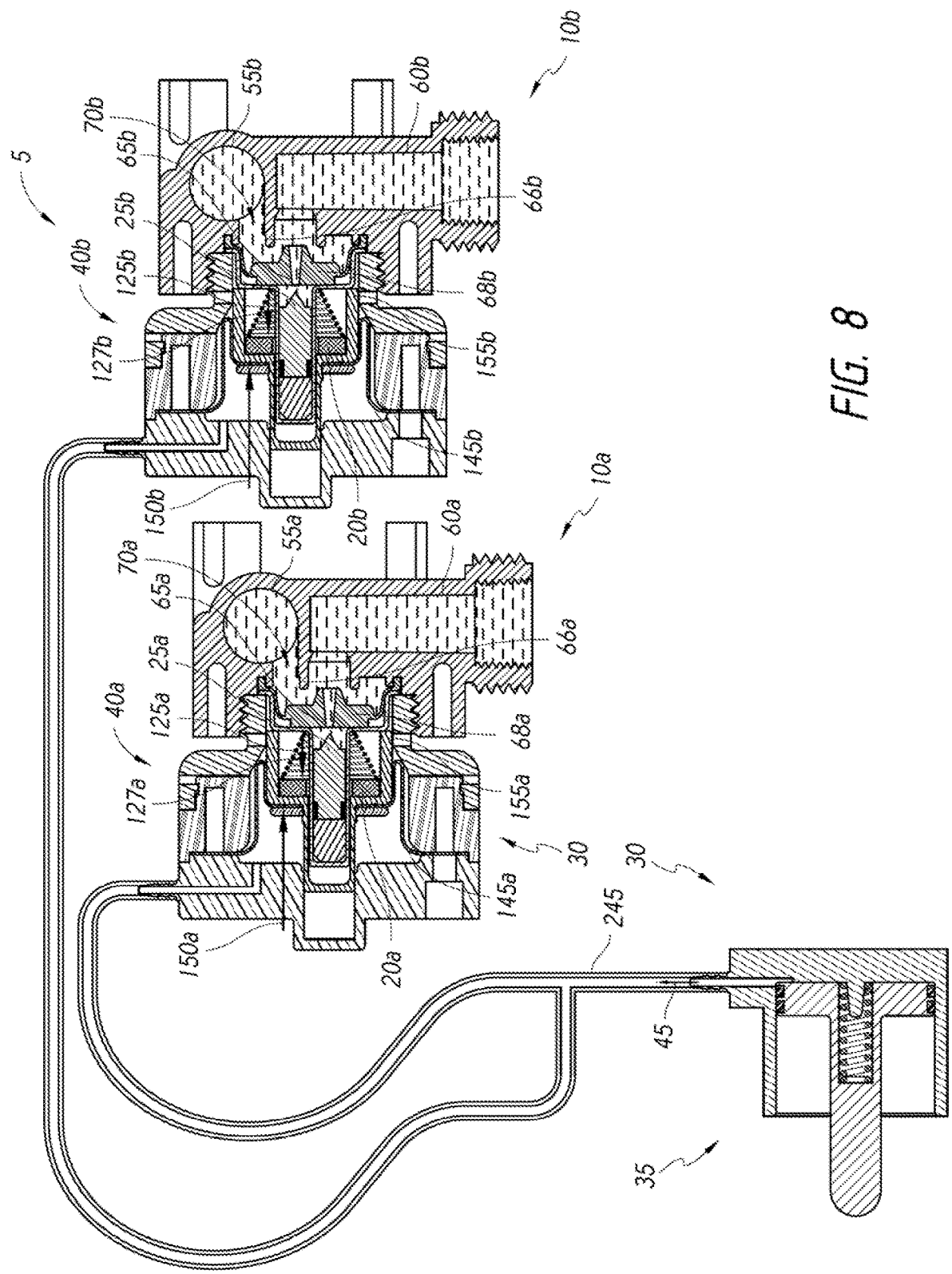
FIG. 8 is a sectional elevation view of one embodiment of the actuated actuator having multiple receivers and associated valve assemblies, the valve assemblies illustrated in the opened position and having magnet springs with identical spring forces.

FIGS. 7 and 8 illustrate an embodiment of an apparatus 5 that utilizes an actuator 30 to remotely and simultaneously actuate multiple valve assemblies 10a and 10b of a dispensing system. Simultaneous actuation of multiple valve assemblies (i.e., of two or more valve assemblies) within a given dispenser is advantageous for obtaining an increased volumetric flow rate of effluent not achievable via a single valve assembly, or for mixing one or more concentrates with the fluid flows of the respective assemblies of the dispenser for later combination of the resulting fluid flow mixtures within the dispenser's dispensing hose.

Referring to FIGS. 7 and 8, receivers 40a and 40b are operably associated with the valve assemblies 10a and 10b, respectively, and in fluid communication with generator 35 via lumen 245. The generator 35, receivers 40a and 40b and associated valve assemblies 10a and 10b of FIGS. 7 and 8 utilize the same components of the apparatus 5 illustrated within FIGS. 1-3, to include the magnet spring 125, respectively denoted within FIGS. 7 and 8 as magnet springs 125a and 125b. While FIGS. 7 and 8 illustrate two valve assemblies and two associated receivers, it is understood that any plurality of valve assemblies and associated receivers may be utilized.

The simultaneous actuation of valve assemblies 10a and 10b is achieved via the utilization of common spring forces for the magnet springs 125a and 125b operably associated with the respective receivers 40a and 40b. Per, the classic formula for the calculation of spring force, each magnet spring force is equal to the product of the spring coefficient of resistance "k" and the spring's displacement distance "x" (i.e., F=kx). Thus, assuming a common displacement distance "x" for each of magnet springs 125a and 125b, each spring has an identical coefficient of resistance "k" (i.e., spring stiffness) to generate an identical magnet spring force 127a and 127b that must be overcome by the respective diaphragm forces 150a and 150b (created by the low pressure signal 45 of the generator 35) acting on pistons 155a and 155b and magnets 20a and 20b.

Thus, referring to FIG. 7, no low pressure signal 45 has been generated by the generator 35 to act upon the respective diaphragms 145a and 146b to create the diaphragm forces 150a and 150b necessary to simultaneously overcome the respective magnet spring forces 127a and 127b, thus allowing the respective armature springs 95a and 95b to maintain the armatures 25a and 25b within the respective armature seats 65a and 65b and thus the valve seals 68a and 68b within the respective valve seal seats 66a and 66b, and thus allowing the valves 70a and 70b to simultaneously preclude a flow of fluid between each respective valve's inlet channels 55a and 55b and outlet channels 60a and 60b.

Referring to FIG. 8, however, the low pressure signal 45 has indeed been generated by the generator 35 to act upon the respective diaphragms 145a and 146b to create the identical diaphragm forces 150a and 150b sufficient to simultaneously overcome the respective identical magnet spring forces 127a and 127b, thus moving the magnets 20a and 20b into proximity with the respective armatures 25a and 25b to draw the armatures away from their respective armature seats 65a and 65b and thus the valve seals 68a and 68b away from the respective valve seal seats 66a and 66b, thus allowing the valves 70a and 70b to simultaneously allow a flow of fluid between each respective valve's inlet channels 55a and 55b and outlet channels 60a and 60b.

Figure 9:
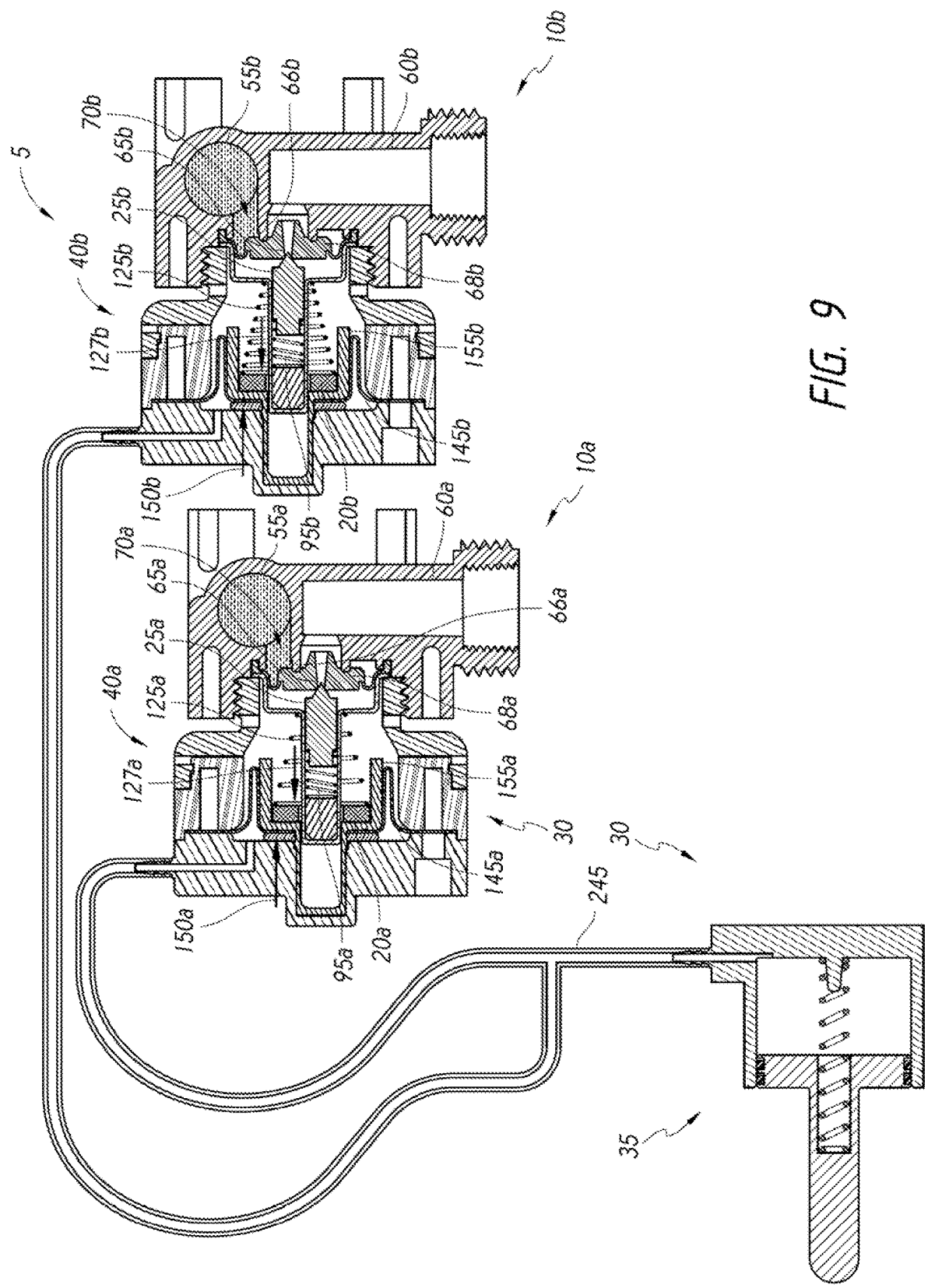
FIG. 9 is a sectional elevation view of one embodiment of the non-actuated actuator having multiple receivers and associated valve assemblies, the valve assemblies illustrated in the closed position and having magnet springs with differing spring forces.
Figure 10:
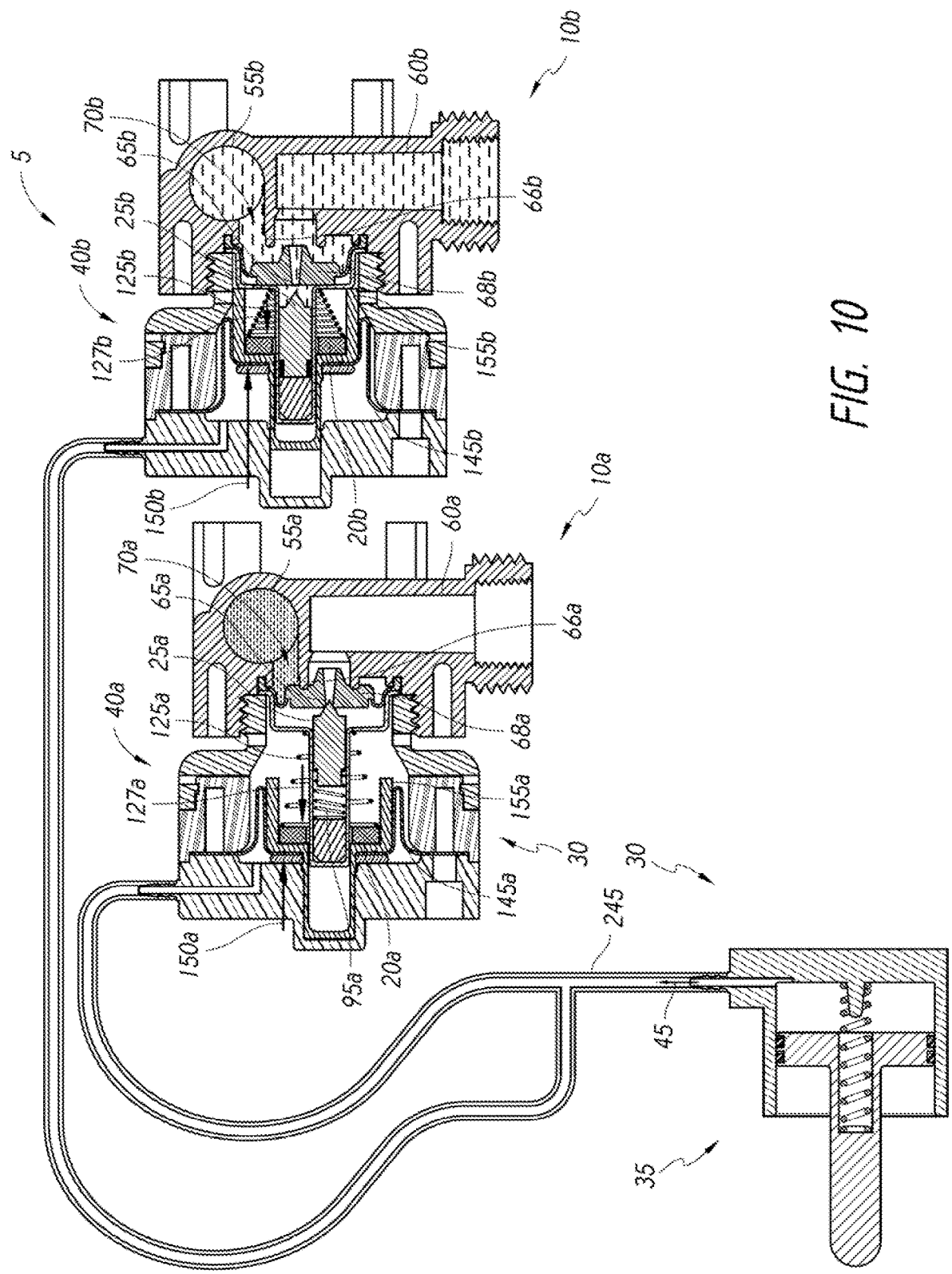
FIG. 10 is a sectional elevation view of one embodiment of the actuated actuator having multiple receivers and associated valve assemblies, the valve assemblies illustrating one valve assembly in the closed position and one valve assembly in the opened position and having magnet springs with differing spring forces.
Figure 11:
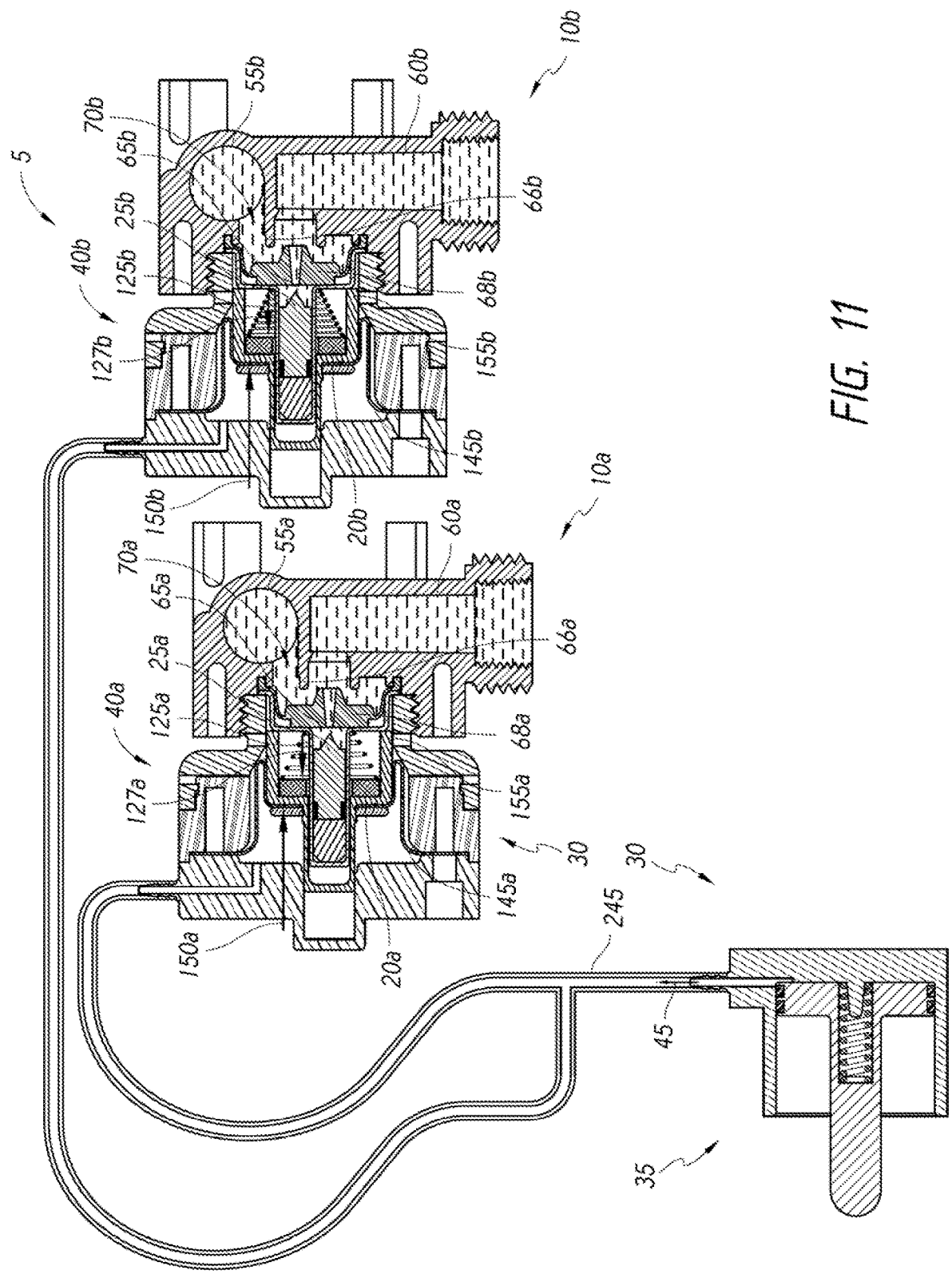
FIG. 11 is a sectional elevation view of one embodiment of the actuated actuator having multiple receivers and associated valve assemblies, the valve assemblies illustrated in the opened position and having magnet springs with differing spring forces.

FIGS. 9, 10 and 11 illustrate an embodiment of an apparatus 5 that utilizes an actuator 30 to remotely and sequentially actuate multiple valve assemblies 10a and 10b of a dispensing system. Sequential actuation of multiple valve assemblies within a dispenser is advantageous for increasing the dispenser's volumetric flow rate from a base flow rate, achieved via a single valve assembly, to an increased flow rate, achieved via the addition of one or more additional such assemblies within the same dispenser. The sequential actuation of multiple valve assemblies within a dispenser is also advantageous for dispensing an unmixed liquid from the dispenser (i.e., plain water), is the use of one valve assembly, and thereafter adding a flow of mixed liquid (i.e., a water-concentrate mixture) from one or more additional such assemblies to the unmixed liquid for further mixture within the dispensing hose of the dispenser.

Referring to FIGS. 9, 10 and 11, receivers 40a and 40b are operably associated with the valve assemblies 10a and 11b, respectively, and in fluid communication with generator 35 via lumen 245. The generator 35, receivers 40a and 40b and associated valve assemblies 10a and 10b of FIGS. 9, 10 and 11 utilize the same components of the apparatus 5 illustrated within FIGS. 1-3, again, to include the magnet spring 125, respectively denoted within FIGS. 9, 10 and 11 as magnet springs 125a and 125b. While FIGS. 9, 10 and 11 illustrate two valve assemblies and two associated receivers, it is understood ant any plurality of valve assemblies and associated receivers may be utilized.

The sequential actuation of valve assemblies 10a and 10b is achieved via the utilization of differing spring forces for the magnet springs 125a and 125b of the respective receivers 40a and 40b. Again, per, the classic formula for the calculation of spring force, each magnet spring force is equal to the product of the spring coefficient of resistance "k" and the spring's displacement distance "x" (i.e., F=kx). Thus, assuming a common displacement distance for each of magnet springs 125a and 125b, each spring has a different coefficient of resistance "k" (i.e., spring stiffness) to generate a different magnet spring force 127a and 127b that must be overcome by the respective identical diaphragm forces 150a and 150b (created by the low pressure signal 45 of the generator 35) acting on pistons 155a and 155b and magnets 20a and 20b.

As is further discussed below, FIGS. 9, 10 and 11 illustrates an example where magnet spring 125a has a higher coefficient of resistance than magnet spring 125b and thus requires a greater diaphragm force than 125b to be overcome by the diaphragm force. However, it is understood that any magnet spring can possess a greater or lesser spring force than any other magnet spring. Furthermore, it is also understood that differing spring forces may also be achieved through maintaining a constant coefficient of resistance for the springs while varying their respective displacement distances, or by varying both the coefficient and displacement.

Thus, referring to FIG. 9, no low pressure signal 45 has been generated by the generator 35 to act upon the respective diaphragms 145a and 146b to create the diaphragm forces 150a and 150b necessary to overcome either of the magnet spring forces 127a and 127b, thus allowing the armature springs 95a and 95b to maintain the armatures 25a and 25b within the respective armature seats 65a and 65b and thus the valve seals 68a and 68b within the respective valve seal seats 66a and 66b, thus allowing the valves 70a and 70b to preclude a flow of fluid between each respective valve's inlet channels 55a and 55b and outlet channels 60a and 60b.

Referring to FIG. 10, however, the low pressure signal 45 has been generated by the generator 35 to act upon the respective diaphragms 145a and 146b to create the identical diaphragm forces 150a and 150b. It is noted that generator 35 has been depressed to approximately only half of its volumetric capacity to generate a low pressure signal 45 of a first pressure (i.e., approximately ½ pressure capacity). This first pressure acts upon the respective diaphragms 145a and 146b to create the identical first diaphragm forces 150a and 150b (i.e., approximately ½ diaphragm force capacity). Although about ½ pressure capacity and about diaphragm force capacity are discussed and illustrated herein, it is understood that such discussion and illustration are "for example" only and that any partial pressure capacity and diaphragm capacity may suffice as well.

Again, magnet spring 127a has a higher resistance coefficient "k" than magnet spring 127b and thus requires a greater diaphragm force to be overcome. In the embodiment of FIG. 10, the first pressure of the low pressure signal 45 created by generator 35 creates identical first diaphragm forces 150a and 150b, with first force 150a being insufficient to overcome the magnet spring forces 127a, thus allowing the armature springs 95a to maintain the armature 25a within the armature seats 65a and thus the valve seals 68a within the valve seal seats 66a thus allowing the valves 70a to preclude a flow of fluid between the valve's inlet channels 55a and outlet channels 60a.

However, because magnet spring 127b has a lower resistance coefficient "k" than magnet spring 127a, the first diaphragm force 150b is sufficient to overcome magnet spring force 127b to move magnet 20b into proximity with the armature 25b, draw the armature away from armature seat 65b and thus the valve seal 68b away from the valve seal seat 66b, and permit the valve 70b to allow a flow of fluid between the valve's inlet channel 55b and outlet channel 60b.

Referring to FIG. 11, the low pressure signal 45 has again been generated by the generator 35 to act upon the respective diaphragms 145a and 146b to create the identical diaphragm forces 150a and 150b. It is noted, however, that generator 35 has been depressed to its full volumetric capacity to generate a low pressure signal 45 of a second pressure (i.e., full pressure capacity). This second pressure acts upon the respective diaphragms 145a and 146b to create the identical second diaphragm forces 150a and 150b (i.e., full diaphragm force capacity).

However, despite magnet spring 127a having a higher resistance coefficient "k" than magnet spring 127b, the identical second diaphragm forces 150a and 150b resulting from the second pressure created by the generator 35 are sufficient to overcome both the respective magnet spring forces 127a and 127b, thus moving the magnets 20a and 20b into proximity with the respective armatures 25a and 25b to draw the armatures away from their respective armature seats 65a and 65b and thus the valve seals 68a and 68b away from the respective valve seal seats 66a and 66b, thus allowing the valves 70a and 70b to each allow a flow of fluid between each respective valve's inlet channels 55a and 55b and outlet channels 60a and 60b.

Yet further unlike the present invention, the prior an mechanical linkage and fluid line systems cannot efficiently facilitate the alternate selection of at least one valve of two or more valves of a dispensing system, with such a valve selection being useful for selecting dispenser flow rates and/or the selection of a desired mixture to be dispensed.

Figure 12:
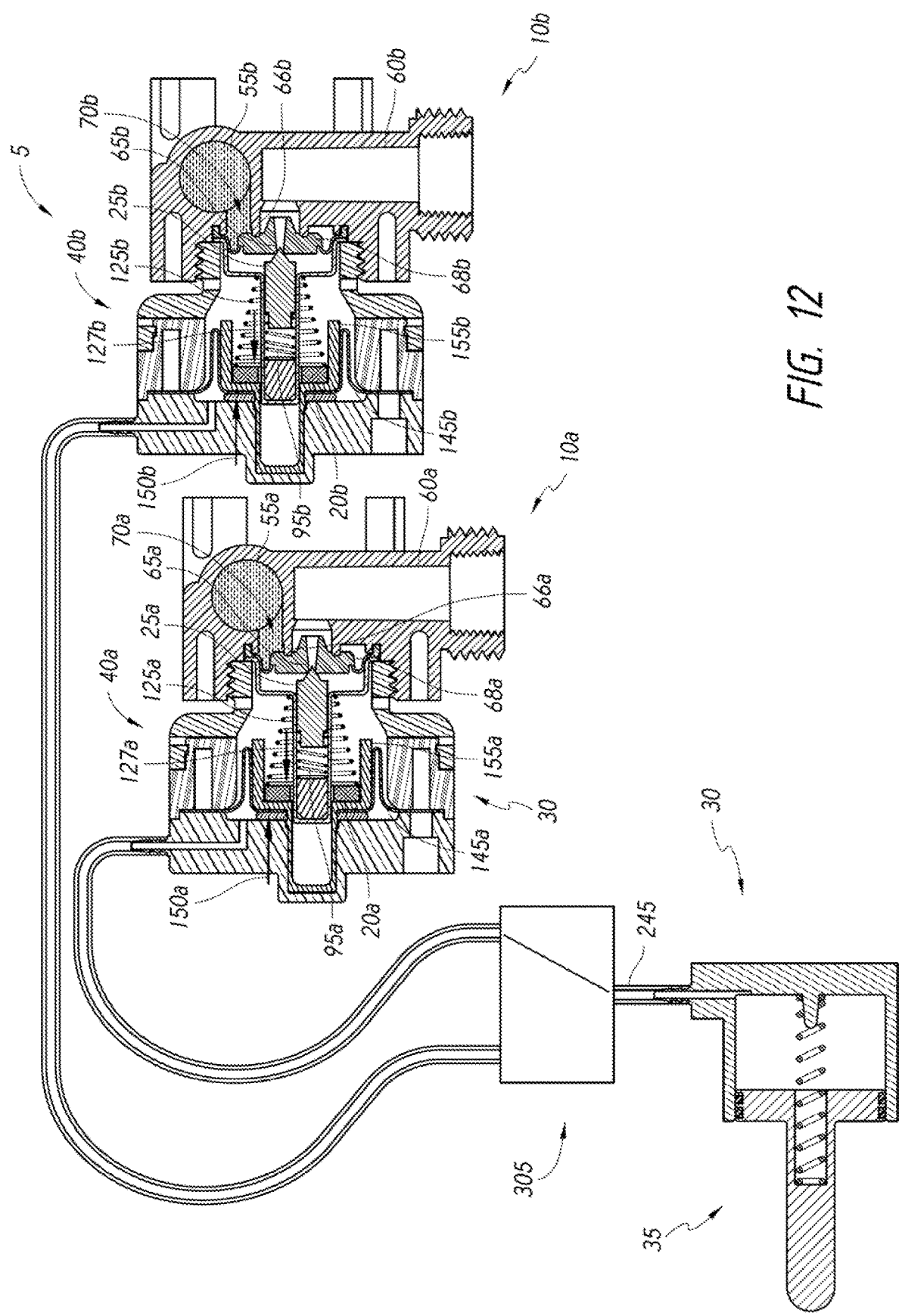
FIG. 12 is a sectional elevation view of one embodiment of the non-actuated actuator utilizing a selector valve in a first position and illustrating the valve assemblies in the closed positions.
Figure 13:
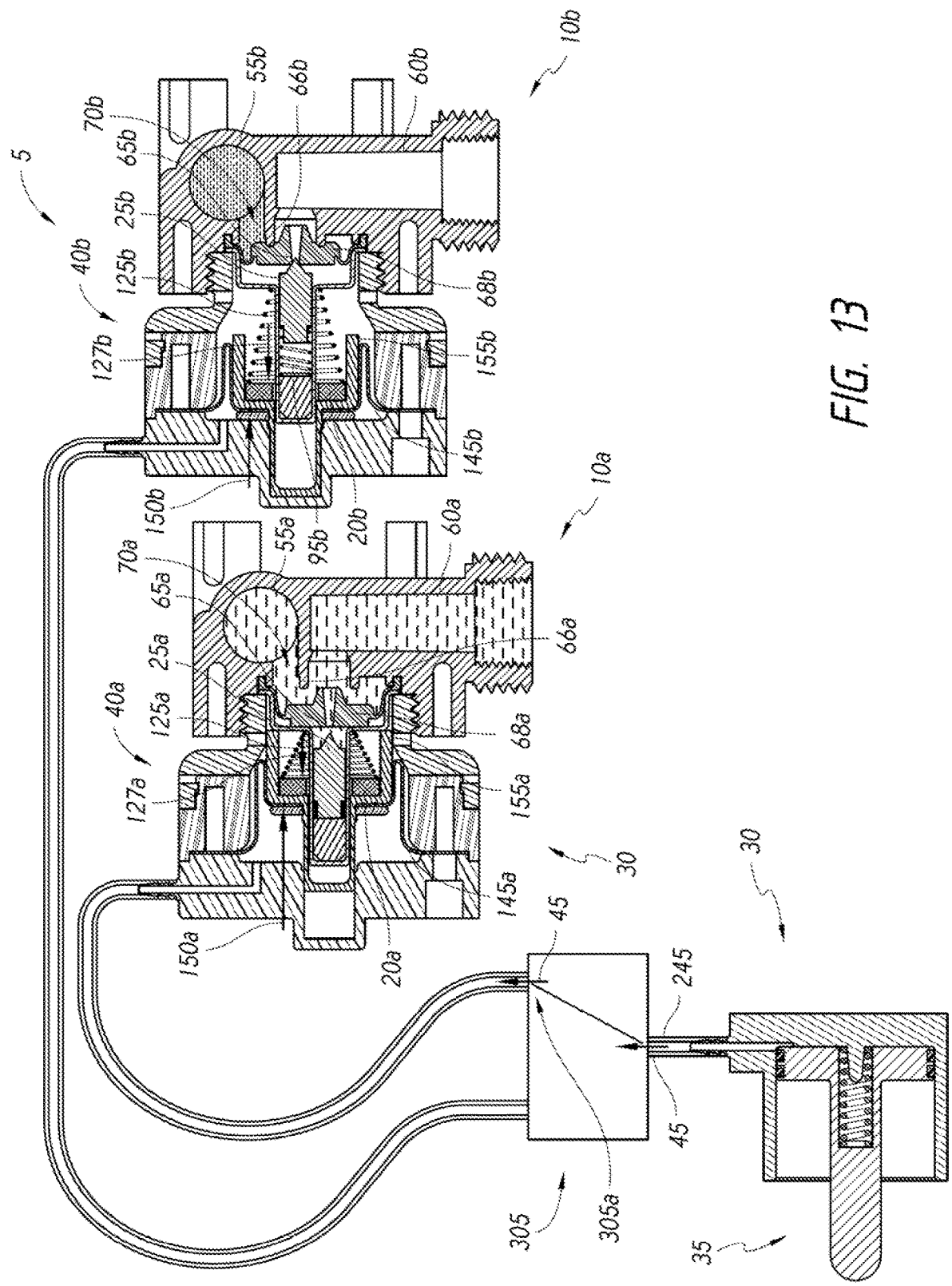
FIG. 13 is a sectional elevation view of one embodiment of the actuated actuator utilizing the selector valve in a first position and illustrating one valve assembly in the opened position and one valve assembly in the closed position.
Figure 14:
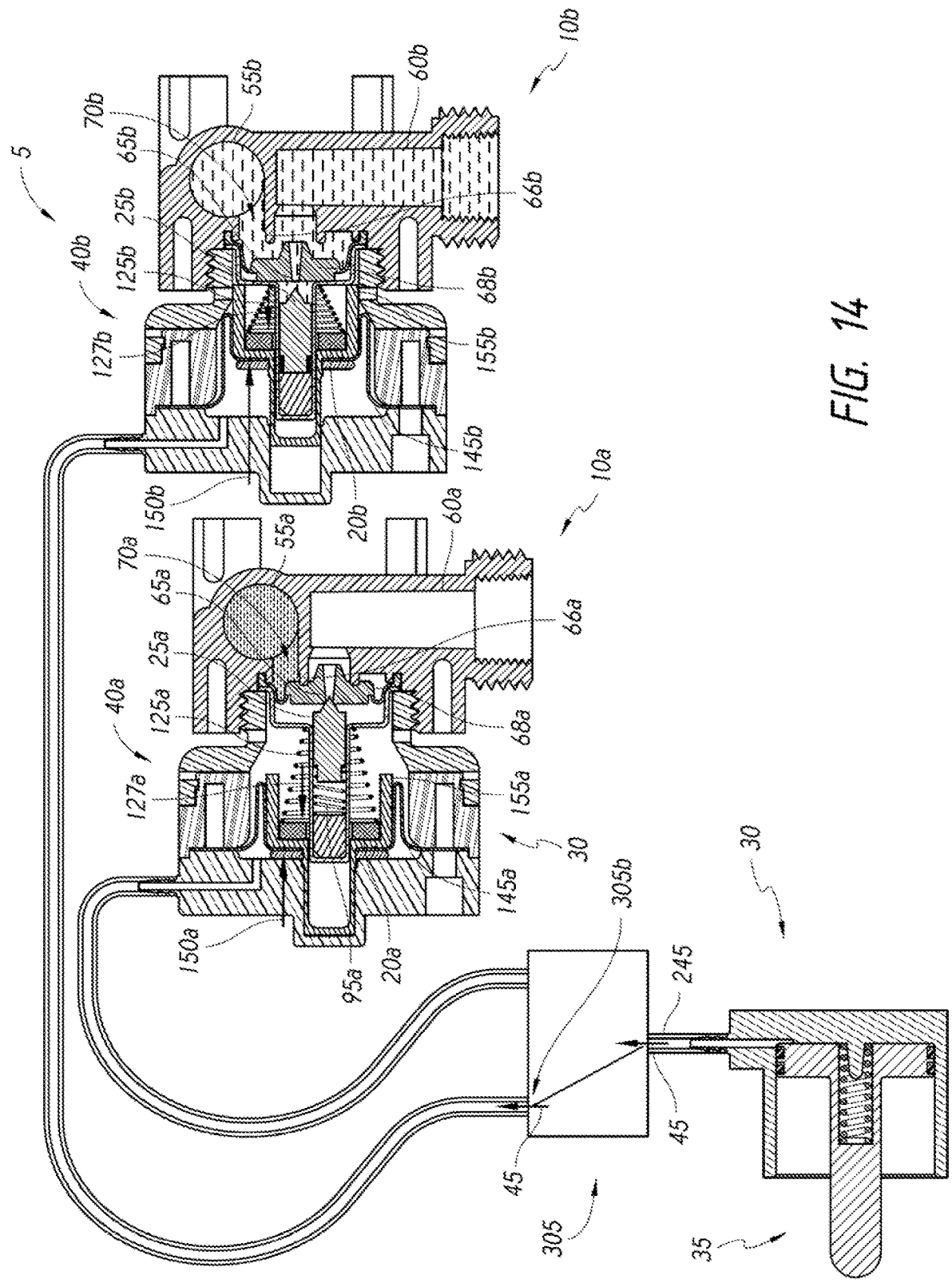
FIG. 14 is a sectional elevation view of one embodiment of the actuated actuator utilizing the selector valve in the second position and illustrating an opposing configuration of one valve assembly in the closed position and one valve assembly in the opened position.

FIGS. 12 through 14 illustrate an embodiment of an apparatus 5 that utilizes an actuator 30 having a selector valve 305 (selector valve 305 illustrated schematically) to remotely select at least one desired valve assembly from multiple valve assemblies 10a and 10b of a dispensing system. Alternate actuation of the at least one valve assembly of multiple valve assemblies within a given dispenser is advantageous for choosing between valve assemblies having different volumetric, flow rates or different mixtures of the concentrates with the respective fluid flows.

Referring to FIGS. 12 through 14, receivers 40a and 40b are again operably associated with the valve assemblies 10a and 10b, respectively, and in fluid communication with generator 35 via lumen 245. The generator 35, receivers 40a and 40b and associated valve assemblies 10a and 10b of FIGS. 12 through 14 utilize the same components of the apparatus 5 illustrated within FIGS. 1-3. Added to these components, however, is selector valve 305. For dispensing systems utilizing two or more valve assemblies, the selector valve is movable between a plurality of selections, with each selection establishing a fluid flow communication between the generator and the given receiver associated with a desired valve assembly of the dispenser. In the embodiment of FIGS. 12 through 14, two selection positions 305a and 305b are illustrated as operably associated with respective receivers 40a and 40b and a respective valve assemblies 10a and 10b. However, it is understood that any number of selections may be available for any number of receivers and respective valve assemblies.

Thus, referring to FIG. 12, no low pressure signal 45 has been generated by the generator 35 for selection by the selector valve 305 to alternately act upon the respective diaphragms 145a and 146b to create the diaphragm forces 150a or 150b necessary to overcome either of the magnet spring forces 127a and 127b, thus allowing the armature springs 95a and 95b to maintain the armatures 25a and 25b within the respective armature seats 65a and 65b and thus the valve seals 68a and 68b within the respective valve seal seats 66a and 66b, thus allowing the valves 70a and 70b to preclude a flow of fluid between each respective valve's inlet channels 55a and 55b and outlet channels 60a and 60b.

Referring to FIG. 13, however, the low pressure signal 45 has indeed been generated by the generator 35 for selection by the selection valve 305 to establish the fluid flow connection between the generator 35 and one of the receivers 40a or 40b. Because the selector valve 305 is in the selection position 305a, the low pressure signal will act upon the selected diaphragm 145a to create the diaphragm force 150a sufficient to overcome the respective magnet spring force 127a, thus moving the magnet 20a into proximity with the respective armature 25a to draw the armature away from its respective armature seat 65a thus the valve seal 68a away from the respective valve seal seat 66a, thus allowing the valve 70a to allow a flow of fluid between the valve's inlet channel 55a outlet channel 60a.

Similarly, referring to FIG. 14, the low pressure signal 45 has again been generated by the generator 35 for selection by the selection valve 305 to establish the fluid flow connection between the generator 35 and one of the receivers 40a or 40b. However, because the selector valve 305 is in the selection position 305b, the low pressure signal will act upon the selected diaphragm 145b to create the diaphragm force 150b sufficient to overcome the respective magnet spring force 127b, thus moving the magnet 20b into proximity with the respective armature 25b to draw the armature away from its respective armature seat 65b thus the valve seal 68b away from the respective valve seal seat 66b, thus allowing the valve 70b to allow a flow of fluid between the valve's inlet channel 55b outlet channel 60b.

In use in one embodiment of the actuator for controlling the valve assembly of the fluid dispenser, the valve assembly is connected to the fluid source and has at least a magnet and co-acting armature. The trigger of the dispensing hose handle is depressed to generate a low-pressure signal within the closed-volume chamber of a pressure vessel. The diaphragm, in fluid communication with the closed-volume chamber, responds to create a diaphragm force to move the magnet of the valve assembly to influence the assembly's armature to open the valve. The piston, located between the diaphragm and magnet, is moved by the diaphragm force to move the magnet of the valve assembly to influence the assembly's armature. The lumen facilitates the fluid communication between the generator and closed-volume chamber of the receiver.

With the valve open, the fluid is allowed to flow from the inlet to the outlet chamber and through the backflow preventer and eductor. Within the eductor, the fluid is mixed with an additive that is drawn into the eductor to create the fluid mixture. The fluid mixture thereafter flows from the eductor, into and through the dispensing hose, and exits the dispensing hose at its discharge end. A release of the trigger will remove the low-pressure signal and diaphragm force to allow the armature of the valve assembly to again close the valve, thus stopping the flow of fluid through the valve and the exit of fluid mixture from the discharge end of the dispensing hose.

In use of embodiments utilizing a manual override, the button of the override is depressed to move the magnet of the valve assembly to influence the assembly's armature to open the valve. The piston, located between the diaphragm and magnet, is moved by the force of the button to move the magnet of the valve assembly to influence the assembly's armature. With the valve open, the fluid is allowed to flow from the inlet to the outlet chamber and through the backflow preventer and eductor. Within the eductor, the fluid is mixed with an additive that is drawn into the eductor to create the fluid mixture. The fluid mixture thereafter flows from the eductor, into and through the dispensing hose, and exits the dispensing hose at its discharge end. A release of the button will remove the force from the magnet to allow the armature of the valve assembly to again close the valve, thus stopping the flow of fluid through the valve and the exit of fluid mixture from the discharge end of the dispensing hose.

In use of embodiments having two or more valve assemblies and simultaneous actuation, two or more valve assemblies are connected to the fluid source, each having at least a magnet and co-acting armature. The trigger of the dispensing hose handle is depressed to generate a low-pressure signal within the closed-volume chambers of the pressure vessels respectively operably associated with the valve assemblies. The diaphragms, in fluid communication with the closed-volume chambers, simultaneously respond to create diaphragm forces to move the magnets of the valve assemblies to influence the assemblies' armatures to open the valves. The pistons, located between the diaphragms and magnets, are moved by the respective diaphragm forces to move the magnets of the valve assemblies to influence the assemblies' respective armatures. The lumen facilitates the fluid communication between the generator and closed-volume chambers of the receivers.

With the valves open, the fluid is allowed to flow from each valve's inlet to the outlet chamber and through the respective backflow preventers and eductors. Within each eductor, the fluid is mixed with an additive that is drawn into the eductor to create the fluid mixture. The fluid mixture thereafter flows from each eductor, into and through the dispensing hose, and exits the dispensing hose at its discharge end. A release of the trigger will remove the low-pressure signal and diaphragm forces simultaneously to allow the armatures of the valve assemblies to again close the valves, thus stopping the flow of fluid through the valves and the exit of fluid mixture from the discharge end of the dispensing hose.

In use of embodiments having two or more valve assemblies and sequential actuation, two or more valve assemblies are connected to the fluid source, each having at least a magnet and co-acting armature. The trigger of the dispensing hose handle is depressed about partially to generate a first low-pressure signal within the closed-volume chambers of the pressure vessels respectively operably associated with the valve assemblies. The diaphragms, in fluid communication with the closed-volume chambers, respond to create first diaphragm forces to move the magnets of one or more of the valve assemblies to influence the one or more assemblies' armatures to open the respective one or more valves.

The piston of one valve assembly, located between the associated diaphragm and magnet and biased by a magnet spring having a spring force less than that of the associated first diaphragm force, is moved by the diaphragm force to move the magnet of the valve assembly to influence the assembly's armature to open the valve. The piston of the other valve assembly, located between the associated diaphragm and magnet and biased by a magnet spring having a spring force greater than that of the associated first diaphragm force, is not moved by the diaphragm force and thus does not move the magnet of the valve assembly to influence the assembly's armature, thus not opening the valve. The lumen facilitates the fluid communication between the generator and closed-volume chamber of each valve's receiver.

With the one valve open, the fluid is allowed to flow from the valve's inlet to the outlet chamber and through the associated backflow preventer and eductor. Within the eductor, the fluid is mixed with an additive that is drawn into the eductor to create the fluid mixture. The fluid mixture thereafter flows from the eductor, into and through the dispensing hose, and exits the dispensing hose at its discharge end. A release of the trigger will remove the low-pressure signal and diaphragm forces, to allow the armature of the open valve assembly to again close the valve, thus stopping the flow of fluid through the valve and the exit of fluid mixture from the discharge end of the dispensing hose.

During further sequential actuation, the trigger of the dispensing hose handle is depressed about fully to generate a second low-pressure signal within the closed-volume chambers of the pressure vessels respectively operably associated with the valve assemblies. The diaphragms, in fluid communication with the closed-volume chambers, respond to create second diaphragm forces to move the magnets of the valve assemblies to influence the assemblies' armatures to open the valves.

The piston of each valve assembly, located between each associated diaphragm and magnet and biased by each magnet spring having a spring force less than that of the associated second diaphragm force, is moved by the diaphragm force to move the magnet of each valve assembly to influence the assembly's armature to open each valve. Again, the lumen facilitates the fluid communication between the generator and closed-volume chamber of each valve's receiver.

With each valve open, the fluid is allowed to flow from each valve's inlet to the outlet chamber and through each associated backflow preventer and eductor. Within each eductor, the fluid is mixed with an additive that is drawn into the eductor to create the respective fluid mixture. Each fluid mixture thereafter flows from each eductor, into and through the dispensing hose, and exits the dispensing hose at its discharge end. A release of the trigger will remove the low-pressure signal and diaphragm forces, to allow the armatures of the open valve assemblies to again close the valves, thus stopping the flow of fluid through the valves and the exit of fluid mixture from the discharge end of the dispensing hose.

In use of embodiments having two or more valve assemblies and alternate actuation, two or more valve assemblies are connected to the fluid source, each having at least a magnet and co-acting armature. The selector valve is operated to select at least one valve assembly of the two or more valve assemblies for actuation. The trigger of the dispensing hose handle is depressed to generate a low-pressure signal within the closed-volume chamber of the pressure vessel operably associated with the selected valve assembly. The diaphragm, in fluid communication with the closed-volume chamber, responds to create a diaphragm force to move the magnet of the selected valve assembly to influence the assembly's armature to open the selected valve.

With the selected valve open, the fluid is allowed to flow from the valve's inlet to the outlet chamber and through the associated backflow preventer and eductor. Within the eductor, the fluid is mixed with an additive that is drawn into the eductor to create the fluid mixture. The fluid mixture thereafter flows from the eductor, into and through the dispensing hose, and exits the dispensing hose at its discharge end. A release of the trigger will remove the low-pressure signal and diaphragm force, to allow the armature of the selected valve assembly to again close the valve, thus stopping the flow of fluid through the valve and the exit of fluid mixture from the discharge end of the dispensing hose. During further alternate actuation, the selector valve is operated to select another at least one valve of the two or more valves for actuation, the trigger of the dispensing hose handle is again depressed to generate a low-pressure signal to open the selected at least one valve, and again released to remove the low pressure signal to close the selected at least one valve.

While this foregoing description and accompanying figures are illustrative of the present invention, other variations in structure and method are possible without departing from the invention's spirit and scope.

We claim:

1. An actuator for controlling two or more valve assemblies of a fluid dispenser, each valve assembly of the two or more valve assemblies connected to a fluid source and comprising at least a magnet and co-acting armature, the actuator comprising:
   a generator located remotely of the two or more valve assemblies for generating a low-pressure signal, the generator manually operated by a user of the fluid dispenser; and
   two or more receivers in fluid communication with the generator for receiving the low pressure signal of each receiver operably associated with each valve assembly, each valve assembly fluffier comprising a magnet spring operably associated with each receiver for influencing the magnet wherein the magnet springs operably associated with the two or more receivers have identical spring forces to facilitate a simultaneous actuation of the two or more valve assemblies.

2. The actuator of claim 1 wherein the generator comprises a bellows.

3. The actuator of claim 1 wherein the generator comprises a bladder.

4. The actuator of claim 1 wherein the generator comprises a piston and cylinder combination.

5. The actuator of claim 1 further comprising a manual override operably associating the magnet with the armature.

6. An actuator for controlling wo or more valve assemblies of a fluid dispenser, each valve assembly of the two or more valve assemblies connected to a fluid source and comprising at least a magnet and co-acting armature, the actuator comprising:
   a generator located remotely of the two or more valve assemblies for generating a low-pressure signal, the generator manually operated by a user of the fluid dispenser; and
   two or more receivers in fluid communication with the generator for receiving the low pressure signal of each receiver operably associated with each valve assembly, each valve assembly further comprising a magnet spring operably associated with each receiver for influencing the magnet wherein the magnet springs operably associated with the two or more receivers have differing spring forces to facilitate a sequential actuation of the two or more valve assemblies.

7. The actuator of claim 6 wherein the differing spring forces comprise differing spring coefficients.

8. The actuator of claim 6 wherein the differing spring forces comprise differing spring displacements.

9. The actuator of claim 6 wherein the generator comprises a bellows.

10. The actuator of claim 6 wherein the generator comprises a bladder.

11. The actuator of claim 6 wherein the generator comprises a piston and cylinder combination.

12. The actuator of claim 6 further comprising a manual override operably associating the magnet with the armature.

13. An actuator for controlling two or more valve assemblies of a fluid dispenser, each valve assembly of the two or more valve assemblies connected to a fluid source and comprising at least a magnet and co-acting armature, the actuator comprising:
- a generator located remotely of the two or more valve assemblies for generating a low-pressure signal, the generator manually operated by a user of the fluid dispenser; and
- two or more receivers in fluid communication with the generator for receiving the low pressure signal of each receiver operably associated with each valve assembly, each valve assembly further comprising a magnet spring operably associated with each receiver for influencing the magnet, the actuator further comprising a selector valve to facilitate an alternate fluid flow connection between the generator and at least one receiver of the two or more receivers.

14. The actuator of claim 13 wherein the generator comprises a bellows.

15. The actuator of claim 13 wherein the generator comprises a bladder.

16. The actuator of claim 13 wherein the generator comprises a piston and cylinder combination.

17. The actuator of claim 13 further comprising a manual override operably associating the magnet with the armature.

18. An actuator for controlling two or valve assemblies of a fluid dispenser, each valve assembly of the at least one valve assembly connected to a fluid source and comprising at least a magnet, magnet spring and co-acting armature, the actuator comprising:
- a generator located remotely of the at least two or more valve assemblies for generating a low-pressure signal, the generator comprising a piston and cylinder combination located within a dispensing handle of the fluid dispenser, the dispensing handle located proximal to a discharge end of a dispensing hose of the dispenser;
- two or more receivers in fluid communication with the generator for receiving the low pressure signal, each receiver operably associated with each valve assembly, the two or more receivers each comprising a pressure vessel defining a closed-volume chamber in fluid communication with the generator and a low-friction diaphragm in fluid communication with the closed-volume chamber, the diaphragm responsive to the low pressure signal of the generator to generate a diaphragm force operable to move the magnet of the respective valve assembly to influence the assembly's armature; and
- wherein the magnet springs operably associated with the two or more receivers have identical spring forces to facilitate a simultaneous actuation of the two or more valve assemblies.

19. An actuator for controlling two or more valve assemblies of a fluid dispenser, each valve assembly of the two or more one valve assemblies connected to a fluid source and comprising at least a magnet, magnet spring and co-acting armature, the actuator comprising:
- a generator located remotely of the two or more valve assemblies for generating a low-pressure signal, the generator comprising a piston and cylinder combination located within a dispensing handle of the fluid dispenser; and
- two or more receivers in fluid communication with the generator for receiving the low pressure signal, each receiver operably associated with each valve assembly, each receiver comprising a pressure vessel defining a closed-volume chamber in fluid communication with the generator and a low-friction diaphragm in fluid communication with the closed-volume chamber, the diaphragm responsive to the low pressure signal of the generator to generate a diaphragm force operable to move the magnet of the respective valve assembly to influence the assembly's armature, the magnet springs operably associated with the two or more receivers having differing spring forces to facilitate a sequential actuation of the two or more valve assemblies.

20. An actuator for controlling two or more valve assemblies of a fluid dispenser, each valve assembly of the two or more valve assemblies connected to a fluid source and comprising at least a magnet, magnet spring and co-acting armature, the actuator comprising:
- a generator located remotely of the two or more valve assemblies for generating a low-pressure signal, the generator comprising a piston and cylinder combination located within a dispensing handle of the fluid dispenser;
- two or more receivers in fluid communication with the generator for receiving the low pressure signal, each receiver operably associated with each valve assembly, each receiver comprising a pressure vessel defining a closed-volume chamber in fluid communication with the generator and a low-friction diaphragm in fluid communication with the closed-volume chamber, the diaphragm responsive to the low pressure signal of the generator to generate a diaphragm force operable to move the magnet of the respective valve assembly to influence the assembly's armature; and a selector valve to facilitate an alternate fluid flow communication between the generator and at least one receiver of the wo or more receivers.

* * * * *